(12) United States Patent
Takagi et al.

(10) Patent No.: US 12,556,116 B2
(45) Date of Patent: Feb. 17, 2026

(54) DRIVING DEVICE AND CONTROL METHOD OF MOTOR

(71) Applicants: KABUSHIKI KAISHA TOSHIBA, Tokyo (JP); Toshiba Electronic Devices & Storage Corporation, Tokyo (JP)

(72) Inventors: Takashi Takagi, Kawasaki (JP); Toshimitsu Aizawa, Yokohama (JP); Tadashi Asukai, Yokohama (JP)

(73) Assignees: KABUSHIKI KAISHA TOSHIBA, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 196 days.

(21) Appl. No.: 18/603,312

(22) Filed: Mar. 13, 2024

(65) Prior Publication Data

US 2025/0080019 A1 Mar. 6, 2025

(30) Foreign Application Priority Data

Sep. 6, 2023 (JP) .................................. 2023-144314

(51) Int. Cl.
*H02K 23/52* (2006.01)
*H02P 21/18* (2016.01)
*H02P 27/06* (2006.01)

(52) U.S. Cl.
CPC .............. *H02P 21/18* (2016.02); *H02P 27/06* (2013.01)

(58) Field of Classification Search
CPC ...... H02P 21/18; H02P 27/06; H02P 23/0004; H02P 21/0003; H02P 25/022;

(Continued)

(56) References Cited

U.S. PATENT DOCUMENTS 11,271,513 B2   3/2022   Takagi et al.
11,456,689 B2   9/2022   Takagi et al.
(Continued)

FOREIGN PATENT DOCUMENTS

JP    2004-254424 A    9/2004
JP    2010-178444 A    8/2010
(Continued)

OTHER PUBLICATIONS

Korean Decision to Grant issued Aug. 20, 2025 in Korean Patent Application No. 10-2024-0025578, (with unedited computer-generated English translation), 6 pages.

(Continued)

*Primary Examiner* — Muhammad S Islam
(74) *Attorney, Agent, or Firm* — Oblon, McClelland, Maier & Neustadt, L.L.P.

(57) ABSTRACT

According to one embodiment, a driving device includes a power converter, a voltage controller and a phase adjuster. The phase adjuster is configured to execute a first phase control process of receiving first information relating to a relationship between a phase of a motor current flowing through the motor and a rotational position of the motor, and adjusting the phase of the driving voltage, based on the first information. The phase adjuster is configured to execute a second phase control process of receiving second information relating to a magnitude of the motor current and third information relating to a rotational speed of the motor, and adjusting the phase of the driving voltage, based on the second information and the third information.

13 Claims, 10 Drawing Sheets

(58) Field of Classification Search
CPC ...... H02P 2207/05; H02P 23/26; H02P 21/06; H02P 23/18; H02P 2201/15
See application file for complete search history.

(56) References Cited

U.S. PATENT DOCUMENTS

2011/0080000 A1* 4/2011 Cullen ................ H02P 9/105
290/31
2020/0295687 A1 9/2020 Takagi et al.

FOREIGN PATENT DOCUMENTS

| JP | 2012-44775 A | 3/2012 |
| JP | 2016-5349 A | 1/2016 |
| JP | 2019-154143 A | 9/2019 |
| JP | 2020-150700 A | 9/2020 |
| JP | 2021-141663 A | 9/2021 |
| KR | 10-2015-0017661 A | 2/2015 |
| KR | 10-2482809 B1 | 12/2022 |

OTHER PUBLICATIONS

Korean Office Action issued May 11, 2025 in Korean Patent Application No. 10-2024-0025578, (with unedited computer-generated English translation), 9 pages.
Korean Office Action issued Jun. 19, 2025 in Korean Patent Application No. 10-2024-0025578, (with unedited computer-generated English translation), 8 pages.

* cited by examiner

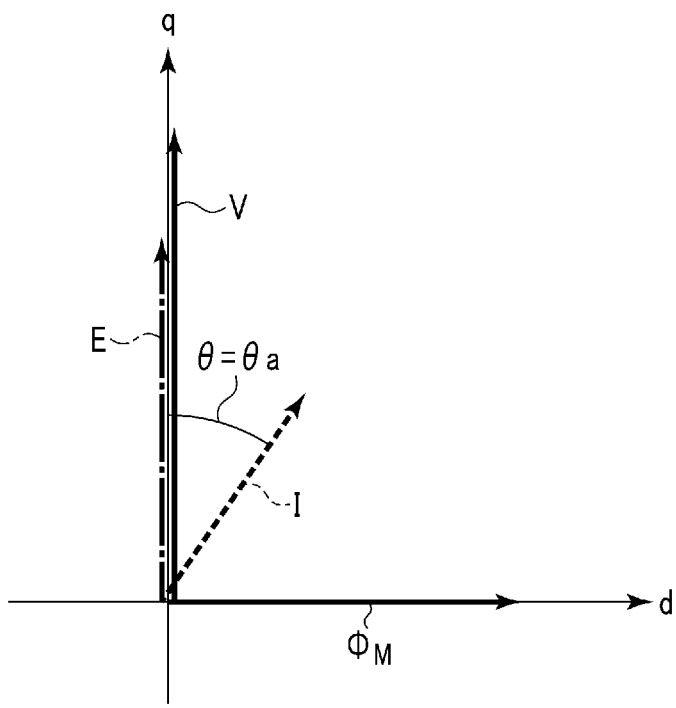
F I G. 1
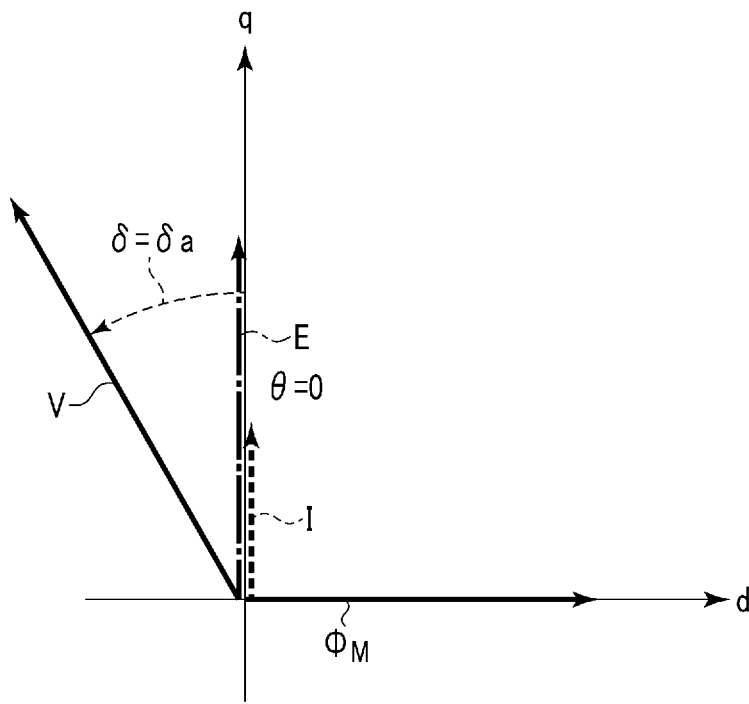
F I G. 2

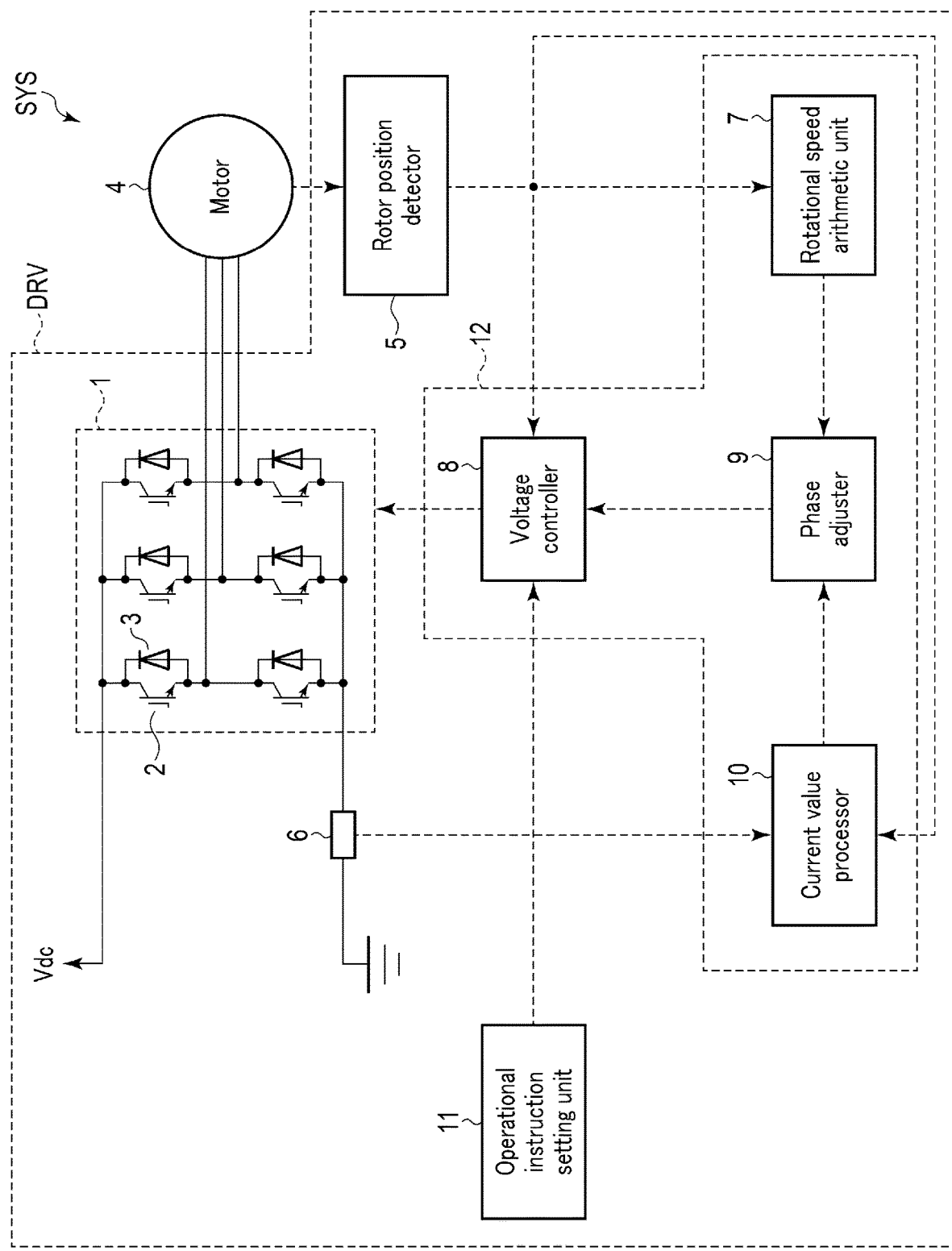
F I G. 5

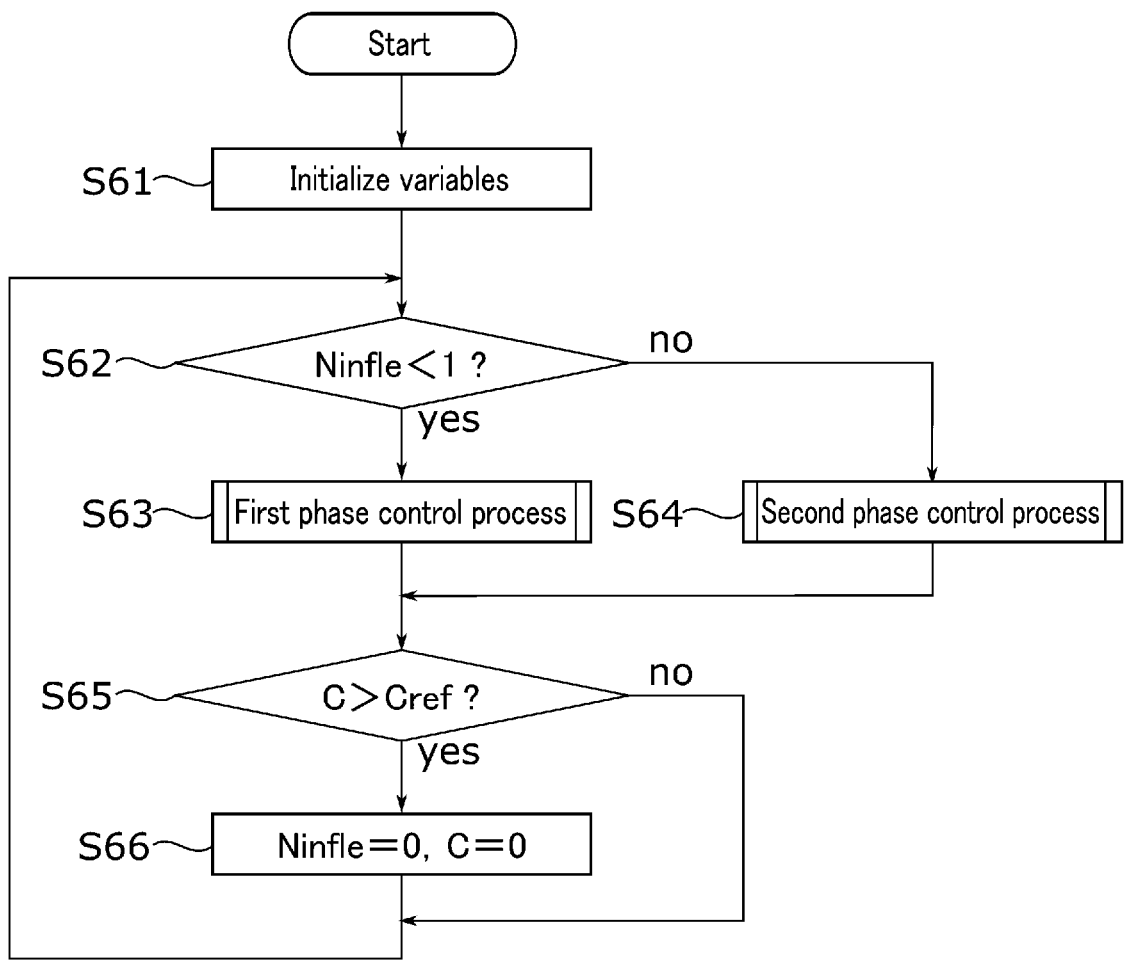
F I G. 6

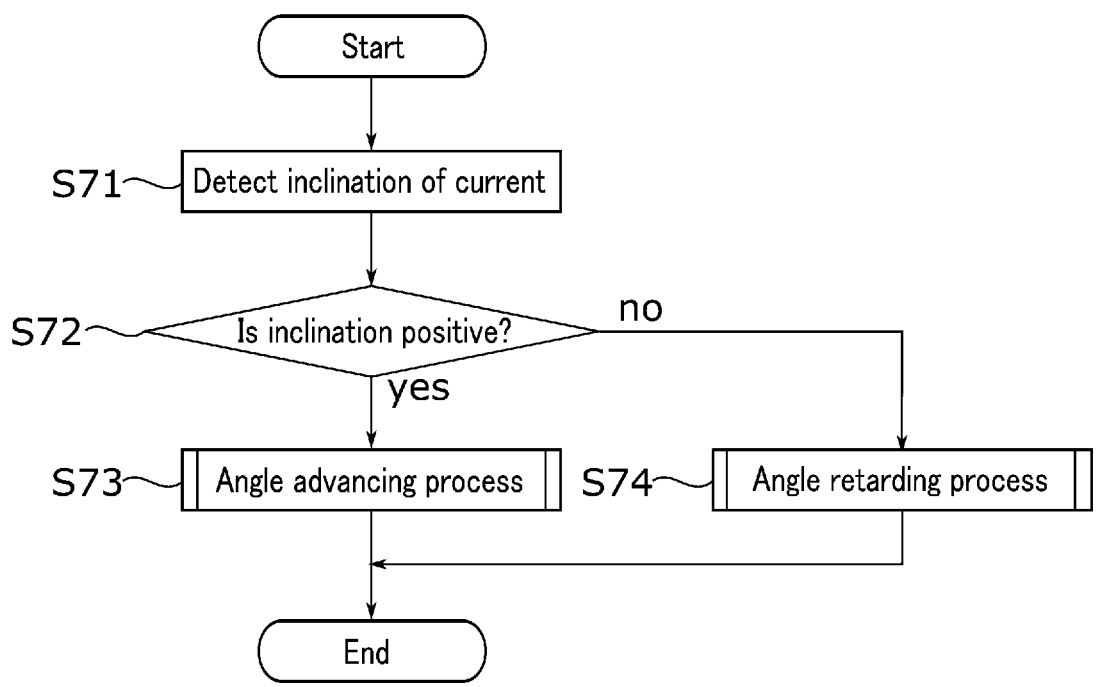
F I G. 7

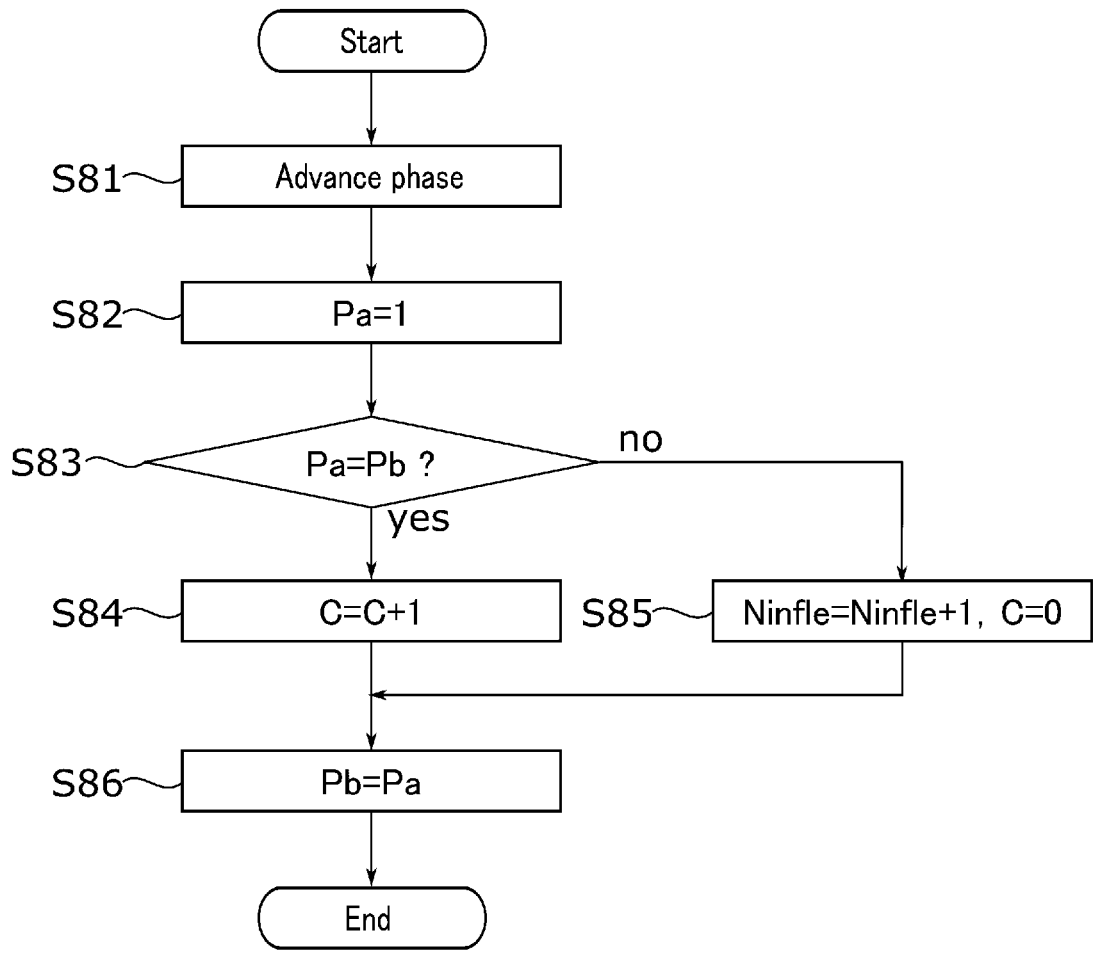
F I G. 8

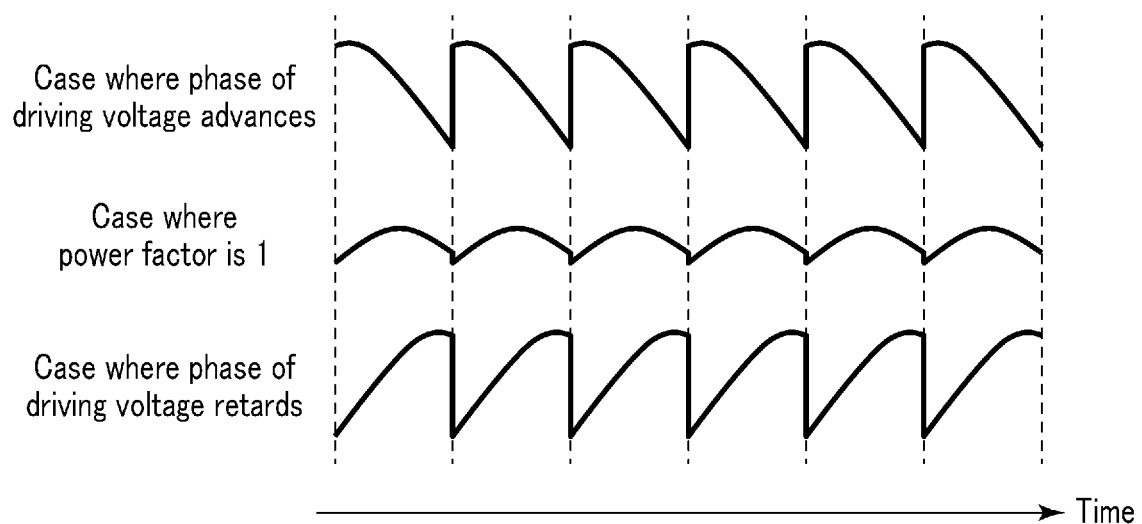
F I G. 11

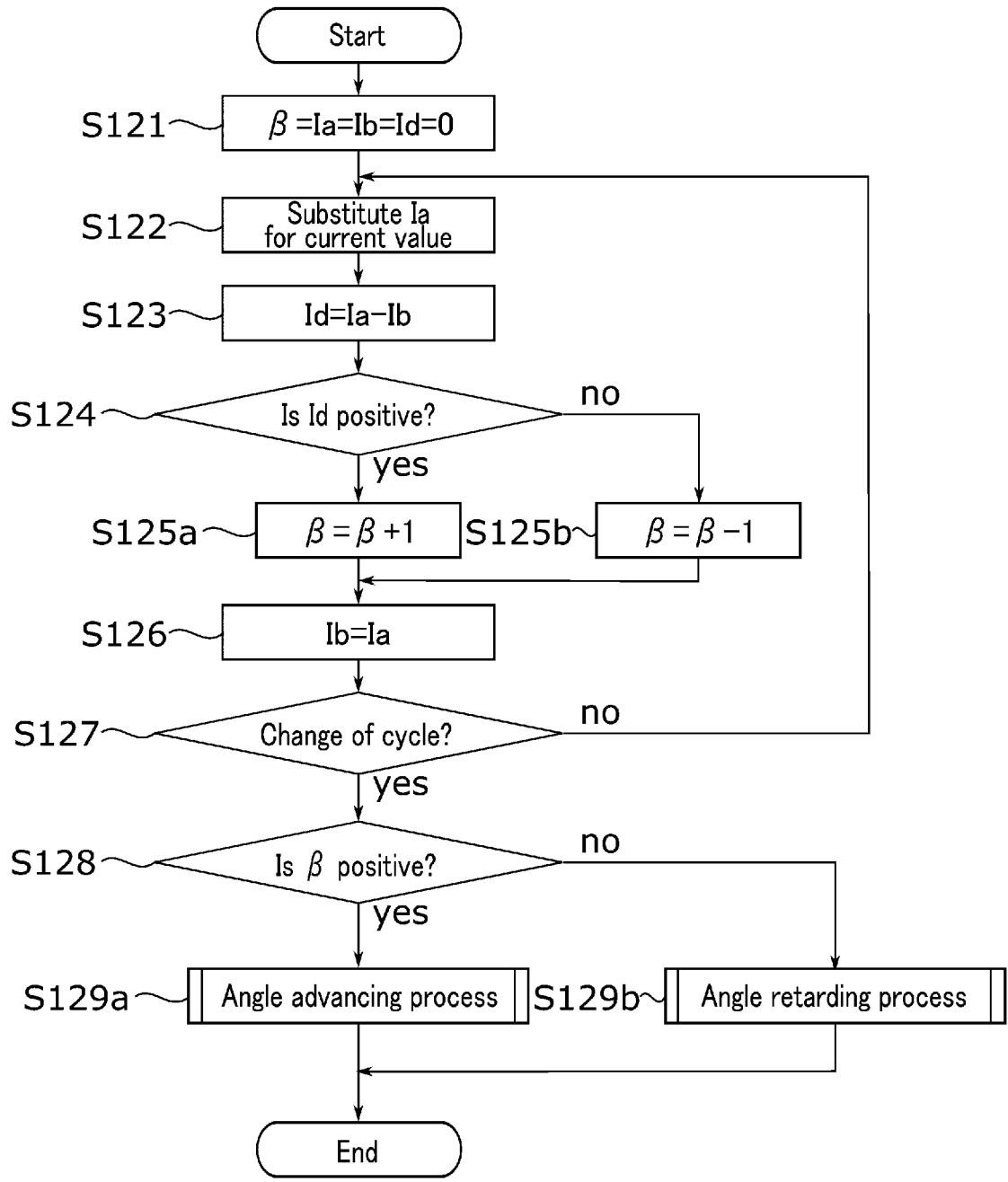
F I G. 12

DRIVING DEVICE AND CONTROL METHOD OF MOTOR

CROSS-REFERENCE TO RELATED APPLICATION

This application is based upon and claims the benefit of priority from prior Japanese Patent Application No. 2023-144314, filed Sep. 6, 2023, the entire contents of which are incorporated herein by reference.

FIELD

Embodiments described herein relate generally to a driving device and a control method of a motor.

BACKGROUND

In order to enhance the efficiency of a motor system, a synchronous motor utilizing a permanent magnet has widely been gaining in popularity, and various control methods of a motor have been proposed. Examples of a control method for enhancing the efficiency include a method in which a voltage phase is adjusted such that a phase of an electromotive force (EMF) (or back-EMF, induced voltage) and a current phase of a motor coincide, and a method in which a voltage phase is adjusted such that a motor current decreases.

BRIEF DESCRIPTION OF THE DRAWINGS

FIGS. 1 and 2 are vector diagrams in regard to a motor utilizing a permanent magnet.

FIG. 5 is a block diagram illustrating a driving device according to a first embodiment, and a driving system.

FIG. 6 is a flowchart for describing a driving operation of the driving device according to the first embodiment.

FIG. 7 is a flowchart illustrating a first phase control process of the driving device according to the first embodiment.

FIG. 8 is a flowchart illustrating an angle advancing process of the driving device according to the first embodiment.

FIG. 11 is a waveform diagram illustrating an example of current detection by a shunt resistor.

FIG. 12 is a flowchart illustrating a first phase control process of a driving device according to a second embodiment.

DETAILED DESCRIPTION

Figure 3:
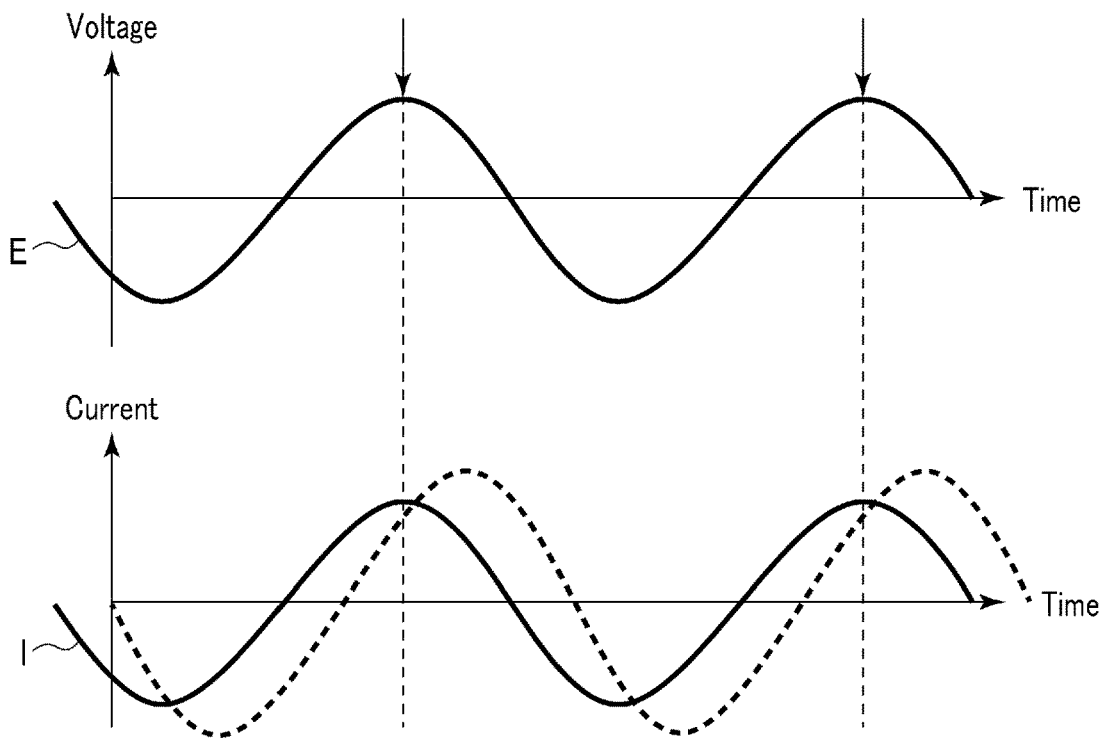
FIG. 3 is a waveform diagram illustrating a relationship between an electromotive force of a motor and a motor current.

In general, according to one embodiment, a driving device includes a power converter, a voltage controller and a phase adjuster. The power converter is configured to convert input power into an AC power, and to supply the AC power to a motor. The voltage controller is configured to control an operation of the power converter, thereby applying a driving voltage from the power converter to the motor. The phase adjuster is configured to execute a first process of advancing a phase of the driving voltage and a second process of retarding the phase of the driving voltage, thereby adjusting the phase of the driving voltage. The phase adjuster is configured to execute a first phase control process of receiving first information relating to a relationship between a phase of a motor current flowing through the motor and a rotational position of the motor, and adjusting the phase of the driving voltage, based on the first information. The phase adjuster is configured to execute a second phase control process of receiving second information relating to a magnitude of the motor current and third information relating to a rotational speed of the motor, and adjusting the phase of the driving voltage, based on the second information and the third information.

Hereinafter, embodiments are described with reference to the accompanying drawings. In the description below, structural elements with substantially identical functions and structures are denoted by like reference signs. In addition, the embodiments to be described below exemplarily illustrate technical concepts. The embodiments do not specify the materials, shapes, structures, arrangements and the like of the structural components. Various modifications can be made to the embodiments.

First Embodiment

To begin with, an outline of a driving control of a motor is described. FIG. 1 and FIG. 2 are vector diagrams in regard to a motor utilizing a permanent magnet. Each of FIG. 1 and FIG. 2 is a vector diagram in coordinates in which a d-axis is a direction of an action of a flux vector $\Phi_M$ of a rotor of the motor, and a q-axis is a direction perpendicular to the d-axis. In addition, each of FIG. 1 and FIG. 2 illustrates, in addition to the flux vector $\Phi_M$, a driving voltage vector V that is applied from a power converter (inverter) to the motor, an electromotive force vector E of the motor, and a current vector I flowing in the motor.

FIG. 1 illustrates a state in which the driving voltage V is applied to the motor such that the driving voltage vector V has the same phase as the electromotive force vector E. In this case, a phase difference θ of the current vector I flowing in the motor in relation to the electromotive force vector E becomes a phase difference θa. The current vector I is in a state of retarding by the phase difference θa in relation to the electromotive force vector E.

FIG. 2 illustrates a state in which the driving voltage V is applied to the motor in a state in which a phase δ of the driving voltage vector V advances by a phase δa in relation to the electromotive force vector E in such a manner that the phase of the current vector I and the phase of the electromotive force vector E coincide. In the state of FIG. 2, a phase shift amount of the driving voltage from the state of FIG. 1 is the phase δa. In this case, by the driving voltage vector V advancing by the phase δa in relation to the electromotive force vector E, the phase of the current vector I of the motor becomes coincident with the phase of the electromotive force vector E. Accordingly, the phase difference θ of the current vector I in relation to the electromotive force vector E becomes zero.

Here, a torque $T_M$ in a surface permanent magnet-type motor can be expressed by equation (1) by using a number of pole pairs, P, of the motor, and the above-described current I and phase difference θ. Note that in equation (1), the motor flux $\Phi_M$ and the motor current I are indicated by scalar quantities.

(Math. 1)
$$T_M = P \times \Phi_M \times I \times \cos\theta \quad (1)$$

In the right side of equation (1), the number of pole pairs, P, and the flux $\Phi_M$ are constants. Here, if it is supposed that the current I is also a constant, the torque $T_M$ can be maximized if cos θ is maximized. A maximum value of cos θ is 1 in a case of θ=0 rad. Specifically, in the surface permanent magnet-type motor, if the condition of the vector diagram illustrated in FIG. 2 is established, the maximum torque can be obtained. Conversely, if a freely selected torque $T_M$ is to be acquired, the current I can be minimized by setting θ=0 rad, and the efficiency can be enhanced.

FIG. 3 is a waveform diagram illustrating a relationship between an electromotive force of a motor and a motor current. An abscissa axis of the waveform diagram indicates time. An ordinate axis indicates voltage or current. In FIG. 3, the waveform of the electromotive force E of the motor and the waveform of the motor current I are illustrated by being vertically arranged. In addition, the current I is indicated by a solid line in a case where the phase of the current I and the phase of the electromotive force E coincide, and is indicated by a broken line in a case where the phase of the current I retards in relation to the electromotive force E. In the surface permanent magnet-type motor, a maximum efficiency is obtained by making coincident the phase of the electromotive force E and the phase of the current I. On the other hand, if the phase of the current I retards in relation to the phase of the electromotive force E, the efficiency deteriorates, and the current I increases, compared to the case where the phase of the electromotive force E and the phase of the current I coincide. The same applies to the case where the phase of the current I advances in relation to the phase of the electromotive force E. The advancement or retardation of the phase of the current I can be adjusted by the phase of the driving voltage V. In other words, the phase of the driving voltage V may be adjusted such that the phase of the current I coincides with the phase of the electromotive force E. Specifically, control may be executed such that if the phase of the current I retards relative to the phase of the electromotive force E that is a reference, the phase of the driving voltage V is advanced, and if the phase of the current I advances relative to the phase of the electromotive force E, the phase of the driving voltage V is retarded. This control is simple and is excellent in regard to responsivity. As a method of determining a phase, for example, such a method is conceivable that an inclination of the waveform of the current I is calculated by using, as a reference, a timing at which the electromotive force E takes a positive peak. In this case, a positive inclination is detected if the phase of the current I retards in relation to the phase of the electromotive force E, and a negative inclination is detected if the phase of the current I advances in relation to the phase of the electromotive force E. In this manner, by detecting the inclination of the waveform of the current I by setting the timing that serves as the reference, the retardation or advancement of the phase can be determined.

On the other hand, a torque $T_M$ in an interior permanent magnet-type motor is expressed by equation (2).

(Math. 2)
$$T_M = P \times \{\Phi_M - (L_q - L_d) \times I \times \sin\theta\} \times I \times \cos\theta \quad (2)$$

In equation (2), an inductance Ld is an inductance of a d-axis component. An inductance Lq is an inductance of a q-axis component. Since the interior permanent magnet-type motor has saliency, a relationship of Lq>Ld is established. Note that in the case of the surface permanent magnet-type motor, since there is no saliency and a relationship of Lq=Ld is established, a term including (Lq−Ld) in equation (2) becomes 0, and equation (2) becomes equivalent to equation (1).

Figure 4:
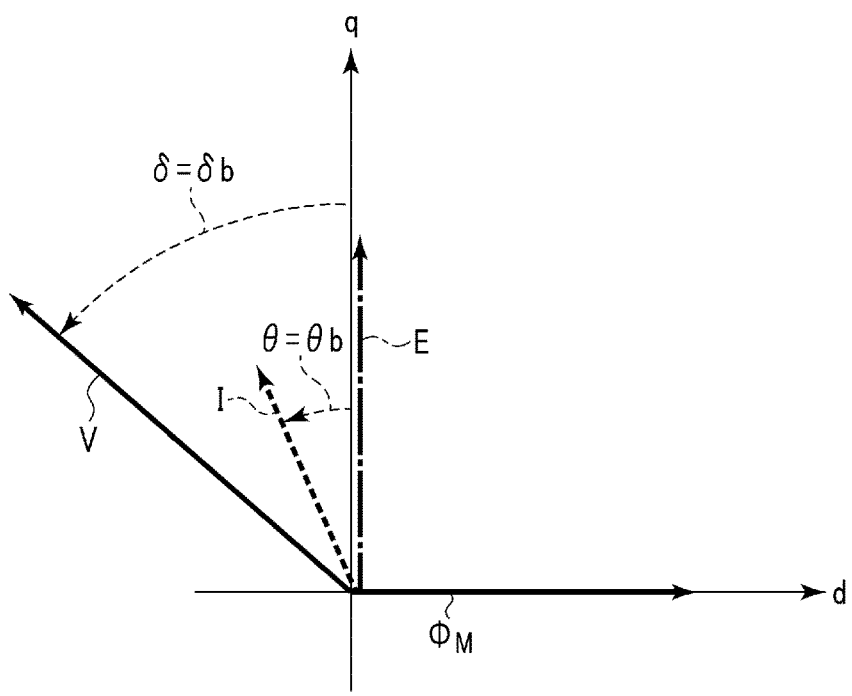
FIG. 4 is a vector diagram in regard to a motor utilizing a permanent magnet.

FIG. 4 is a vector diagram in regard to a motor utilizing a permanent magnet. In FIG. 4, a d-axis is a direction of an action of a flux vector $\Phi_M$ of a rotor of the motor, and a q-axis is a direction perpendicular to the d-axis. In FIG. 4, compared to the case of FIG. 1 and FIG. 2, the phase of the driving voltage vector V is further advanced, and the phase shift amount is set at δb, and thereby the phase of the current vector I of the motor is advanced by a phase θb in relation to the electromotive force vector E. Here, as a high efficiency control method of the interior permanent magnet-type motor, MTPA (Maximum Torque Per Ampere) control is known, and an optimal phase θc of the motor current is expressed by equation (3), with the motor flux being $\Phi_a$.

(Math. 3)
$$\sin\theta_c = \frac{-\Phi_a + \sqrt{\Phi_a^2 + 8 \times (L_q - L_d)^2 \times I^2}}{4 \times (L_q - L_d) \times I} \quad (3)$$

Since the result of equation (3) is positive, the optimal phase θc of the current I of the interior permanent magnet-type advances in relation to the phase of the electromotive force E, as illustrated in FIG. 4. In addition, since the phase θ depends on the current I in equation (3), the optimal phase θc of the current I of the interior permanent magnet-type motor varies in accordance with the load or the operation state. Note that since the above-described control to make coincident the phase of the electromotive force E and the phase of the current I is control aiming at θ=0 rad, a maximum efficiency cannot be acquired by this control in the interior permanent magnet-type motor in which the optimal phase is not 0 rad.

In the meantime, equation (3) for calculating the optimal phase θ of the current I in the interior permanent magnet-type motor includes a square root and division. In the case of constituting a driving system of a motor, no problem arises if a CPU (Central Processing Unit) with a relatively high processing performance is used, but implementation is difficult if the driving system is constituted by an inexpensive, small-sized IC (Integrated Circuit) with a relatively low processing performance. As a method for acquiring the optimal phase θc of the current I of the interior permanent magnet-type motor without calculating a square root or division, the following method, for example, may be used. Based on the principle of the MTPA, it suffices to maximize the torque in relation to the current I, or to minimize the current I in relation to the torque. Thus, a ratio, $I/T_M$, of the torque $T_M$ in relation to the current I is used as an index.

Although the torque $T_M$ is included in the index $I/T_M$, in order to express the torque, it is necessary, as indicated in equations (1) and (2), to set the information such as the motor flux and inductance. In the motor control using the IC with a relatively low processing performance, it is difficult to treat many parameters. Thus, attention is paid to an equation of motion indicated in equation (4). Note that M is a motor inertia constant, ω is an angular velocity, $T_M$ is a motor output torque, $T_L$ is a load torque, and ΔT is a deviation between the motor output torque and the load torque (i.e., $T_M$-$T_L$).

(Math. 4)
$$M \times \frac{\partial \omega}{\partial t} = T_M - T_L = \Delta T \quad (4)$$

Here, equation (5) is obtained if equation (4) is transformed from a viewpoint of a variation from a freely selected time and velocity, i.e., if further equation transformation is performed by replacing a term, in which ω is partially differentiated by t, with Δω/Ts. Note that Δω is a velocity deviation, and Ts is a control cycle.

(Math. 5)
$$\Delta \omega = \frac{T_s}{M} \times \Delta T \quad (5)$$

In equation (5), since the control cycle Ts and the motor inertia constant M are constants, the velocity deviation Δω and torque deviation ΔT have a proportional relation. Accordingly, in the above-described index I/$T_M$, by replacing the torque $T_M$ with the velocity ω by taking the relation of equation (5) into account, an index η that is equivalent to the ratio of the current I to the torque $T_M$ can be treated as indicated in equation (6).

(Math. 6)
$$\eta = \frac{I}{\omega} \quad (6)$$

Based on the index obtained by equation (6), the phase of the driving voltage V is adjusted in such a manner as to decrease this index, thus being able to bring the current I into the optimal phase. Note that although equation (6) includes division, the control system has a count value N (N is a positive integer corresponding to an inverse number of velocity) for observing an elapsed time of a freely selected period in the control process for obtaining the velocity ω. Thus, the index can be expressed by multiplication as indicated by the following equation (7).

(Math. 7)
$$\eta = I \times N \quad (7)$$

In the phase adjustment method of the current I by the index η, in accordance with a variation of the index η after executing a process of advancing the phase (adjustment in a direction of advancing the phase of the driving voltage) or a process of retarding the phase (adjustment in a direction of retarding the phase of the driving voltage), the direction of control in the next arithmetic cycle is determined based on points in Table 1 below.

TABLE 1

|  | Previous process is process of advancing phase | Previous process is process of retarding phase |
|---|---|---|
| Decrease of index η | Process of advancing phase | Process of retarding phase |
| Increase of index η | Process of retarding phase | Process of advancing phase |

As indicated in Table 1, in a case where the index η decreases and the process of advancing the phase was executed previously, the process of advancing the phase is executed. In a case where the index η decreases and the process of retarding the phase was executed previously, the process of retarding the phase is executed. In a case where the index η increases and the process of advancing the phase was executed previously, the process of retarding the phase is executed. In a case where the index η increases and the process of retarding the phase was executed previously, the process of advancing the phase is executed.

Note that a situation in which a change from the process of advancing the phase to the process of retarding the phase, or from the process of retarding the phase to the process of advancing the phase, is repeated in a short period by the above method can be regarded as indicating that the phase of the current I is near the optimal value. A change from the process of advancing the phase to the process of retarding the phase, or a change from the process of retarding the phase to the process of advancing the phase, is defined as a number of times of inflection points, Ninfle, and a freely selected upper limit value is set for this number of times, and thereby the phase control is converged (terminated) after a predetermined repetition of trials. Since trials are repeated in this manner, time is needed for convergence in this method. Note that if the process of advancing the phase or the process of retarding the phase is successively executed by a predetermined number of times, the number of times of inflection points, Ninfle, is reset to 0, and convergence to a value other than the optimal phase is avoided.

As described above, as the method of phase control at the time of driving the motor, there are the method of making coincident the phase of the electromotive force E and the phase of the current I, and the method of minimizing the index η. The former is excellent in responsivity, and the latter enables high-efficiency driving of even the interior permanent magnet-type motor. In the first embodiment, by combining these two kinds of control methods, a driving device that has good responsivity and can drive the motor with high efficiency can be achieved.

A description is given of the driving device according to the first embodiment, and a driving system including this driving device and a motor, which achieve the above-described controls. FIG. 5 is a block diagram illustrating the driving device according to the first embodiment, and the driving system. As illustrated in FIG. 5, a driving system SYS includes a motor 4 and a driving device DRV.

The motor 4 is a three-phase synchronous motor. The motor 4 includes a rotor. The motor 4 is driven by the driving device DRV, and the rotor rotates.

The driving device DRV is a device that drives the motor 4. The driving device DRV includes a power converter 1, a rotor position detector 5, a current detector 6, a rotational speed arithmetic unit 7, a voltage controller 8, a phase adjuster 9, a current value processor 10, and an operational instruction setting unit 11.

The power converter 1 converts a DC (direct current) voltage into an AC (alternating current) voltage of a freely chosen voltage and frequency. The power converter 1 includes, for example, six IGBTs (Insulated Gate Bipolar Transistors) 2, and six free-wheel diodes 3. The six IGBTs 2 are bridge-connected in three phases, and constitute a so-called inverter circuit. Each of the free-wheel diodes 3 is provided between a collector and an emitter of each of the IGBTs 2 in such a manner that the anode thereof is connected to the emitter and the cathode thereof is connected to the collector. A DC voltage is supplied to the power converter 1 from a DC power supply Vdc that is a driving power supply. Each of three output terminals (three-phase output terminals) of the power converter 1 is connected to a corresponding one of three stator windings (three-phase stator windings) of the motor 4.

The rotor position detector 5 detects the position (rotational position) of the rotor of the motor 4. For example, the rotor position detector 5 includes a rotary encoder or a Hall sensor, or the like, which is attached to the motor 4, and detects the position of the rotor from an output of the rotary encoder or Hall sensor, or the like. By detecting the position of the rotor, the phase of the three-phase electromotive force E occurring in the motor 4 is detected. Information relating to the position of the rotor, i.e., information relating to the phase of the three-phase electromotive force E occurring in the motor 4 is transmitted to the rotational speed arithmetic unit 7, voltage controller 8 and current value processor 10.

The current detector 6 detects the current I flowing through the motor 4. The current detector 6 detects the current I in regard to at least one phase of the motor 4. The current detector 6 includes a shunt resistor or a current sensor, or the like. In the present embodiment, a description is given of, by way of example, a so-called 1-shunt method in which a shunt resistor is disposed at one location of a power supply line on a negative side (ground side) of the power converter 1.

The rotational speed arithmetic unit 7 calculates a rotational speed from a variation amount of a rotational position. Based on the information relating to the position of the rotor, which is received from the rotor position detector 5, the rotational speed arithmetic unit 7 calculates the rotational speed, and transmits the calculated rotational speed to the phase adjuster 9 as a count value N.

The current value processor 10 processes information relating to the current detected by the current detector 6. The current value processor 10 includes a zero-cross detection circuit and a peak hold circuit. The current value processor 10 detects, from the information relating to the current I, a zero-cross at which the current I changes from a positive current to a negative current, or a zero-cross at which the current I changes from a negative current to a positive current. Further, based on the detected zero-cross, the current value processor 10 discriminates a start and an end of one cycle of the current I. In addition, the current value processor 10 detects a peak value Ip of the current I in one cycle. The current value processor 10 detects the peak value Ip in every cycle. The current value processor 10 transmits the information relating to the cycle of the current and the peak value Ip to the phase adjuster 9. In addition, the current value processor 10 detects an inclination of the waveform of the current I, or, in other words, detects a direction of a change of the current I with the passing of time. The current value processor 10 detects the inclination of the waveform of the current I, based on the information relating to the phase of the electromotive force E, which is received from the rotor position detector 5, for example, in accordance with the timing of the peak of the electromotive force E. To detect the inclination of the waveform of the current I means to determine whether the current I increases or decreases with the passing of time. The current value processor 10 transmits the information relating to the inclination of the waveform of the current I to the phase adjuster 9.

The phase adjuster 9 determines a shift amount of the phase, based on the information relating to the rotational speed and/or the information relating to the current. The phase adjuster 9 receives the information relating to the rotational speed from the rotational speed arithmetic unit 7, and receives the information relating to the current I from the current value processor 10. Based on these pieces of information, the phase adjuster 9 calculates a phase shift amount as to how to shift the phase of the driving voltage V in relation to the phase of the electromotive force E, and transmits the calculated phase shift amount to the voltage controller 8.

In the operational instruction setting unit 11, an instruction relating to the operation of the motor 4 is set. The operational instruction setting unit 11 includes, for example, a user interface, and an instruction relating to the operation of the motor 4 is set by a user or the like. The instruction that is set in the operational instruction setting unit 11 is transmitted to the voltage controller 8. For example, a duty ratio is set in the operational instruction setting unit 11, and the set duty ratio is transmitted to the voltage controller 8. The user interface provided in the operational instruction setting unit 11 may be, for example, a touch panel, an operation button, or a remote controller.

The voltage controller 8 controls the power converter 1, and causes the power converter 1 to supply AC power to the motor 4. The voltage controller 8 controls ON/OFF of each of the six IGBTs 2 included in the power converter 1, thereby causing the power converter 1 to convert the DC power supply voltage Vdc into an AC voltage of a freely selected voltage and frequency, and to output the AC voltage to the motor 4. Specifically, the voltage controller 8 executes control as to how the power converter 1 outputs the driving voltage V. The control of the six IGBTs 2 by the voltage controller 8 is based on the information relating to the position of the rotor, which is received from the rotor position detector 5, the phase shift amount received from the phase adjuster 9, and the duty ratio received from the operational instruction setting unit 11.

The rotational speed arithmetic unit 7, voltage controller 8, phase adjuster 9 and current value processor 10 are implemented, for example, in an integrated circuit 12. The integrated circuit 12 is an IC (Integrated Circuit) chip. The integrated circuit 12 includes a processor and a storage medium. The integrated circuit 12 may be a microcomputer including a CPU, or an ASIC (Application Specific Integrated Circuit), or an FPGA (Field Programmable Gate Array). The integrated circuit 12 including the processor executes a process to be described below, by executing a program or the like stored in the storage medium or the like.

FIG. 6 is a flowchart for describing a driving operation of the driving device according to the first embodiment. The driving operation is an operation in which the driving device DRV drives the motor 4.

If the driving operation is started (Start), the phase adjuster 9 initializes variables (S61). Specifically, each of variables Pa, Pb, C, $\eta a$, $\eta b$, Stage, and $\alpha$ is initialized to 0, and the number of times of inflection points, Ninfle, is initialized to $-1$. The variables Pa and Pb are variables used in an angle advancing process and an angle retarding process, which are described later. The variable Pa is a variable indicating whether a currently executed process is an angle advancing process or an angle retarding process, and 1 is substituted therefor in the case of the angle advancing process and −1 is substituted in the case of the angle retarding process. The variable Pb is a variable indicating whether a previously executed process is an angle advancing process or an angle retarding process, and 1 is substituted therefor in the case of the angle advancing process and −1 is substituted in the case of the angle retarding process. The variable C is a variable that is counted up at a time when the process of advancing the phase is successively executed, or at a time when the process of retarding the phase is successively executed. The variables $\eta a$, $\eta b$, Stage and $\alpha$ are variables used in a second phase control process to be described later. A value obtained by integrating the index $\eta$ indicated in equation (7) by a plurality of number of times is stored in the variable $\eta a$. An integrated value, which was stored in the variable $\eta a$ before resetting the variable $\eta a$ in order to integrate the present variable $\eta a$, is stored in the variable $\eta b$. One of Stages, to which the state of phase adjustment corresponds, is stored in the variable Stage. The details of the Stages are described later. The variable $\alpha$ is a variable indicating the passage of cycles, and if the process of each Stage is executed, 1 is added to the variable $\alpha$ or the variable $\alpha$ is reset to 0. The number of times of inflection points, Ninfle, is a variable that is counted up at a time when the process of advancing the phase is changed to the process of retarding the phase, or at a time when the process of retarding the phase is changed to the process of advancing the phase. Note that the number of times of inflection points, Ninfle, is initialized to not 0 but −1, in order to cancel the influence of count-up of the number of times of inflection points, Ninfle, at a time when either the angle advancing process or the angle retarding process, which is described later, is first executed.

Next, the phase adjuster 9 determines whether the number of times of inflection points, Ninfle, is less than 1 (S62). By determining whether the number of times of inflection points, Ninfle, is less than 1, the phase adjuster 9 determines whether the present phase is near an optimal phase. Note that the number "1", with which the number of times of inflection points, Ninfle, is compared in S62, is a threshold, and may be 2 or 3. The threshold, with which the number of times of inflection points, Ninfle, is compared in S62, can be set at a freely chosen value.

If the number of times of inflection points, Ninfle, is less than 1 (S62, Yes), the phase adjuster 9 executes a first phase control process (S63). The first phase control process is a process of adjusting the phase of the driving voltage V in such a direction that the phase of the current I and the phase of the electromotive force E coincide. In other words, the first phase control process is a process of adjusting the phase of the driving voltage V, based on the relationship between the phase of the current I and the rotational position information of the motor 4. Since the number of times of inflection points, Ninfle, is less than 1, the phase adjuster 9 can estimate that the present phase of the driving voltage V deviates from the optimal phase. Thus, the phase adjuster 9 executes the first phase control process that is more excellent in responsivity than the second phase control process. The details of the first phase control process are described later. If the first phase control process is completed, the phase adjuster 9 executes a process of S65.

On the other hand, if the number of times of inflection points, Ninfle, is not less than 1 (S62, No), the phase adjuster 9 executes a second phase control process (S64). The second phase control process is a process of adjusting the phase of the driving voltage V in such a direction that the index calculated from the peak value of the current I and the rotational speed of the motor 4 decreases. In other words, the second phase control process is a process of adjusting the phase of the driving voltage V, based on the magnitude of the current I and the rotational speed of the motor 4. Since the number of times of inflection points, Ninfle, is not less than 1, i.e., is counted up to 1 or more, the phase adjuster 9 can estimate that the present phase of the driving voltage V is near the optimal phase. Thus, the phase adjuster 9 executes the second phase control process that can drive the motor with higher efficiency than the first phase control process. The details of the second phase control process are described later. If the second phase control process is completed, the phase adjuster 9 executes the process of S65.

In the process of S65, the phase adjuster 9 determines whether the variable C is greater than a threshold Cref (S65). By determining whether the variable C is greater than the threshold Cref, the phase adjuster 9 determines whether the process of advancing the phase or the process of retarding the phase is successively executed.

If the variable C is greater than the threshold Cref (S65, Yes), the phase adjuster 9 substitutes 0 for the number of times of inflection points, Ninfle, and substitutes 0 for the variable C (S66). Since the variable C is greater than the threshold Cref, it is understood that the process of advancing the phase or the process of retarding the phase was successively executed by a number of times greater than the threshold Cref. In order to avoid convergence to a value other than the optimal phase, the phase adjuster 9 sets the number of times of inflection points, Ninfle, to 0, and initializes the variable C to 0. If the process of S66 is completed, the process of S62 is executed.

On the other hand, if the variable C is not greater than the threshold Cref (S65, No), the process of S62 is executed. If the variable C is not greater than the threshold Cref, i.e., if the variable C is equal to or less than the threshold Cref, the process advances to the next step without changing the variable.

Subsequently, the process of S62 to S66 is repeatedly executed while the driving operation is being executed.

FIG. 7 is a flowchart illustrating the first phase control process of the driving device according to the first embodiment.

If the first phase control process is started (Start), the phase adjuster 9 detects the inclination of the current, based on the output of the current value processor 10 (S71). Specifically, the phase adjuster 9 receives the information relating to the inclination of the waveform of the current I from the current value processor 10.

Next, the phase adjuster 9 determines whether the detected inclination is positive (S72).

If the detected inclination is positive (S72, Yes), the phase adjuster 9 executes the angle advancing process (S73). The angle advancing process is a process of advancing the phase of the driving voltage V, and updating the number of times of inflection points, Ninfle, and/or the variable C, based on the previous angle advancing process or angle retarding process. The details of the angle advancing process are described later. Since the detected inclination is positive, it is estimated that the phase of the current I retards in relation to the phase of the electromotive force E. Thus, by executing the angle advancing process and advancing the phase of the driving voltage V, the phase of the driving voltage V can be made closer to the optimal phase. If the angle advancing process is completed, the first phase control process is terminated (End).

On the other hand, in S72, if the detected inclination is not positive (S72, No), the phase adjuster 9 executes the angle retarding process (S74). The angle retarding process is a process of retarding the phase of the driving voltage V, and updating the number of times of inflection points, Ninfle, and/or the variable C, based on the previous angle advancing process or angle retarding process. The details of the angle retarding process are described later. Since the detected inclination is not positive, i.e., is negative, it is estimated that the phase of the current I advances in relation to the phase of the electromotive force E. Thus, by executing the angle retarding process and retarding the phase of the driving voltage V, the phase of the driving voltage V can be made closer to the optimal phase. If the angle retarding process is completed, the first phase control process is terminated (End).

FIG. 8 is a flowchart illustrating the angle advancing process of the driving device according to the first embodiment.

If the angle advancing process is started (Start), the phase adjuster 9 advances the phase of the driving voltage V by adding a phase shift amount (S81).

Next, the phase adjuster 9 substitutes 1 for the variable Pa (S82).

Subsequently, the phase adjuster 9 determines whether the variable Pa and the variable Pb are equal (S83).

If the variable Pa and the variable Pb are equal (S83, Yes), the phase adjuster 9 adds 1 to the variable C (S84). Specifically, count-up is executed to indicate that the process of advancing the phase was successively executed. If the process of S84 is completed, the phase adjuster 9 executes a process of S86.

On the other hand, if the variable Pa and the variable Pb are not equal (S83, No), i.e., if the variable Pa and the variable Pb are different, the phase adjuster 9 adds 1 to the number of times of inflection points, Ninfle, and substitutes 0 for the variable C (S85). Since the variable Pa and the variable Pb are different, it is understood that the angle retarding process was executed previously, and the angle advancing process was executed this time. Thus, the number of times of inflection points, Ninfle, is counted up, and the variable C is reset to 0. If the process of S85 is completed, the phase adjuster 9 executes the process of S86.

In the process of S86, the phase adjuster 9 substitutes the variable Pa for the variable Pb (S86). By this process, at a time when the angle advancing process or angle retarding process is executed next time, the process executed this time can be referred to. If the process of S86 is completed, the angle advancing process is terminated (End).

Figure 9:
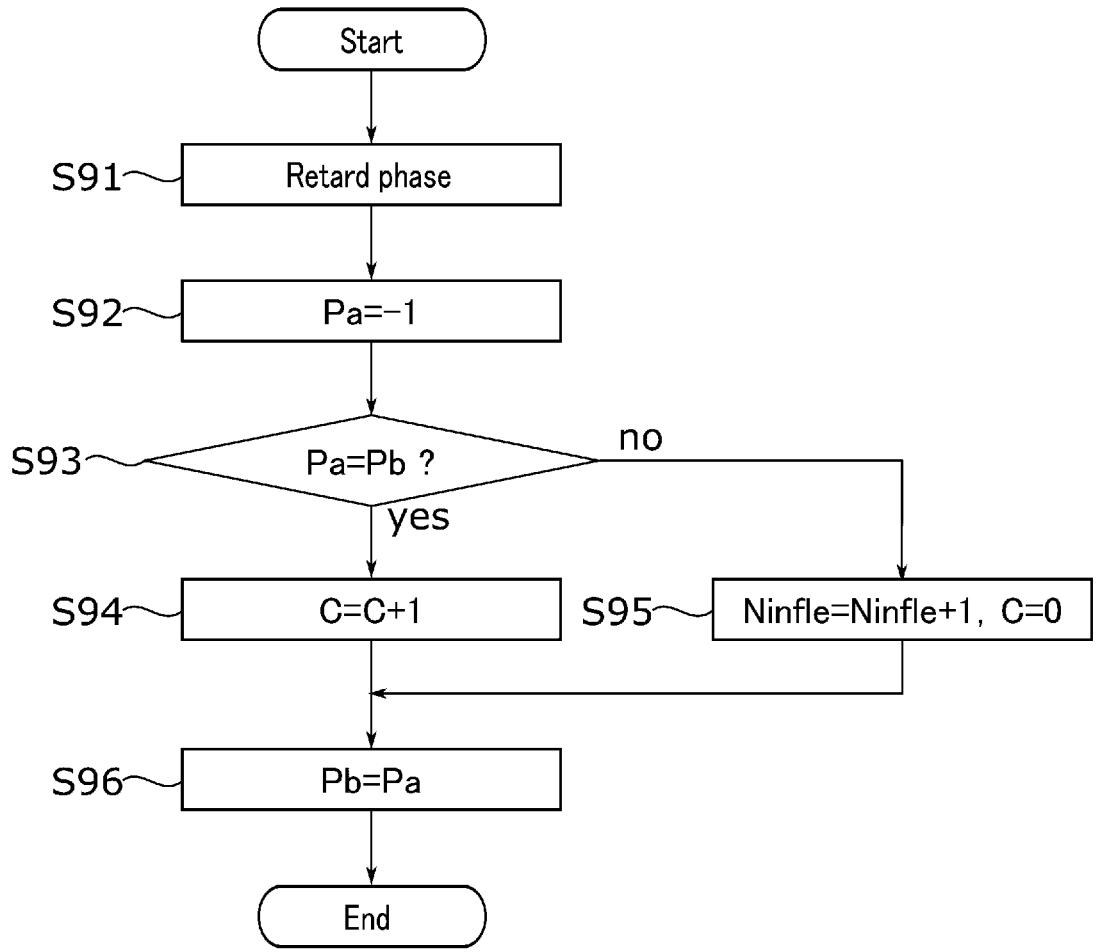
FIG. 9 is a flowchart illustrating an angle retarding process of the driving device according to the first embodiment.

FIG. 9 is a flowchart illustrating the angle retarding process of the driving device according to the first embodiment.

If the angle retarding process is started (Start), the phase adjuster 9 retards the phase of the driving voltage by subtracting a phase shift amount (S91).

Next, the phase adjuster 9 substitutes −1 for the variable Pa (S92).

Subsequently, the phase adjuster 9 determines whether the variable Pa and the variable Pb are equal (S93).

If the variable Pa and the variable Pb are equal (S93, Yes), the phase adjuster 9 adds 1 to the variable C (S94). Specifically, count-up is executed to indicate that the process of retarding the phase was successively executed. If the process of S94 is completed, the phase adjuster 9 executes a process of S96.

On the other hand, if the variable Pa and the variable Pb are not equal (S93, No), i.e., if the variable Pa and the variable Pb are different, the phase adjuster 9 adds 1 to the number of times of inflection points, Ninfle, and substitutes 0 for the variable C (S95). Since the variable Pa and the variable Pb are different, it is understood that the angle advancing process was executed previously, and the angle retarding process was executed this time. Thus, the number of times of inflection points, Ninfle, is counted up, and the variable C is reset to 0. If the process of S95 is completed, the phase adjuster 9 executes the process of S96.

In the process of S96, the phase adjuster 9 substitutes the variable Pa for the variable Pb (S96). If the process of S96 is completed, the angle retarding process is terminated (End).

Figure 10:
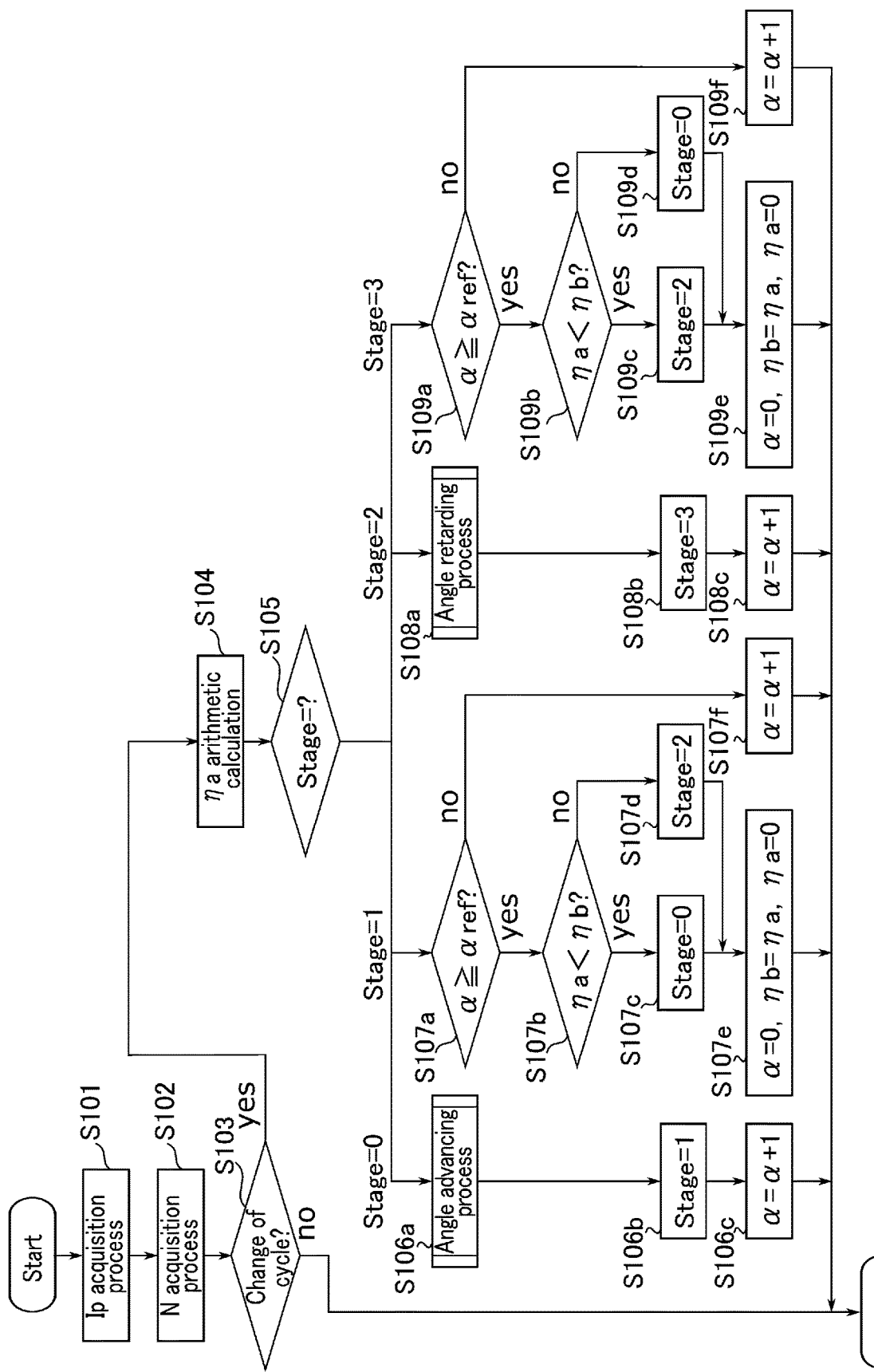
FIG. 10 is a flowchart illustrating a second phase control process of the driving device according to the first embodiment.

FIG. 10 is a flowchart illustrating the second phase control process of the driving device according to the first embodiment.

If the second phase control process is started (Start), the phase adjuster 9 acquires the peak value Ip of the current (S101). Specifically, the phase adjuster 9 receives the peak value Ip of the current from the current value processor 10.

Next, the phase adjuster 9 acquires the count value N (S102). Specifically, the phase adjuster 9 receives the count value N from the rotational speed arithmetic unit 7.

Subsequently, the phase adjuster 9 determines whether the cycle of the current I has changed to the next cycle (S103). Specifically, based on the zero-cross detection result by the rotational speed arithmetic unit 7, the phase adjuster 9 determines whether the cycle of the current I has changed to the next cycle. Based on the determination result, it is determined whether the process of S104 onwards is executed. In addition, by this determination, the process of S104 onwards is executed once in every cycle of the current I.

If the cycle of the current I has not changed to the next cycle (S103, No), the second phase control process is terminated (End).

If the cycle of the current I has changed to the next cycle (S103, Yes), the phase adjuster 9 substitutes an arithmetic calculation result for the variable $\eta a$ (S104). A variable $\eta a(n)$ of an n-th cycle is expressed as indicated in equation (8), by using a variable $\eta a(n-1)$ of an (n−1)th cycle, and a variable $\eta(n)$ of an n-th cycle. Specifically, the value substituted for the variable $\eta a$ is a value obtained by integrating the index $\eta$ indicated in equation (7) by a plurality of number of times.

$$\eta a(n) = \eta a(n-1) + \eta(n) = \eta a(n-1) + Ip \times N \qquad (8)$$

Next, the phase adjuster 9 determines which Stage corresponds to the state of the phase adjustment of the driving voltage V (S105). The Stages include, for example four Stages 0, 1, 2 and 3. Stage 0 is a state in which the phase is advanced and Stage 1 is next executed. Stage 1 is selected after the process of advancing the phase in Stage 0 is completed. Stage 1 is a state in which it is determined whether the variable $\eta a$ becomes less than the previous integrated value, or becomes equal to or greater than the previous integrated value, and, based on the determination, Stage 0 or Stage 2 is set to be selected in the next process. Stage 2 is a state in which the phase is retarded and Stage 3 is set to be next executed. Stage 3 is selected after the process of retarding the phase in Stage 2 is completed. Stage 3 is a state in which it is determined whether the variable $\eta a$ becomes less than the previous integrated value, or becomes equal to or greater than the previous integrated value, and, based on the determination, Stage 0 or Stage 2 is set to be selected in the next process.

In step S105, if the Stage is 0 (S105, Stage=0), the phase adjuster 9 executes the angle advancing process (S106a). The angle advancing process is the same as described with reference to FIG. 8. Next, the phase adjuster 9 sets the Stage to 1 (S106b). Subsequently, the phase adjuster 9 adds 1 to the variable α (S106c). If the process of S106c is completed, the second phase control process is terminated (End).

In S105, if the Stage is 1 (S105, Stage=1), the phase adjuster 9 determines whether the variable α is equal to or greater than a reference value αref (S107a). The reference value αref is a value for determining up to what number of times the index η is integrated, at a time of calculating the variable ηa. If the variable α is not equal to or greater than the reference value αref (S107a, No), the phase adjuster 9 adds 1 to the variable α (S107f). If the process of S107f is completed, the second phase control process is terminated (End).

On the other hand, in S107a, if the variable α is equal to or greater than the reference value αref (S107a, Yes), the phase adjuster 9 determines whether the variable ηa is less than the variable ηb (S107b). If the variable ηa is less than the variable ηb (S107b, Yes), the phase adjuster 9 sets the Stage to 0 (S107c). Specifically, the phase adjuster 9 causes the angle advancing process to be executed at a time when the second phase control process is executed next time and the process of S105 onwards is executed. If the process of S107c is completed, the phase adjuster 9 executes a process of S107e.

On the other hand, if the variable ηa is not less than the variable ηb (S107b, No), the phase adjuster 9 sets the Stage to 2 (S107d). Specifically, the phase adjuster 9 causes the angle retarding process to be executed at a time when the second phase control process is executed next time and the process of S105 onwards is executed. If the process of S107d is completed, the phase adjuster 9 executes the process of S107e.

In the process of S107e, the phase adjuster 9 substitutes 0 for the variable α, substitutes the variable ηa for the variable ηb, and substitutes 0 for the variable ηa (S107e). If the above process is reviewed, it is confirmed in the process of S107a that the variable ηa is integrated by prescribed cycles, the large/small relation between the variable ηa and the variable ηb is confirmed in S107b, and the Stage is changed in the process of S107c or S107d. Thus, the purpose of S107e is to prepare for the next operation by resetting or updating the respective variables. In step S107e, the phase adjuster 9 resets the variable α to 0, stores the value of the variable ηa in the variable ηb, and resets the variable ηa to 0. If the process of S107e is completed, the second phase control process is terminated (End).

In step S105, if the Stage is 2 (S105, Stage=2), the phase adjuster 9 executes the angle retarding process (S108a). The angle retarding process is the same as described with reference to FIG. 9. Next, the phase adjuster 9 sets the Stage to 3 (S108b). Subsequently, the phase adjuster 9 adds 1 to the variable α (S108c). If the process of S108c is completed, the second phase control process is terminated (End).

In S105, if the Stage is 3 (S105, Stage=3), the phase adjuster 9 determines whether the variable α is equal to or greater than the reference value αref (S109a). If the variable α is not equal to or greater than the reference value αref (S109a, No), the phase adjuster 9 adds 1 to the variable α (S109f). If the process of S109f is completed, the second phase control process is terminated (End).

On the other hand, in S109a, if the variable α is equal to or greater than the reference value αref (S109a, Yes), the phase adjuster 9 determines whether the variable ηa is less than the variable ηb (S109b). If the variable ηa is less than the variable ηb (S109b, Yes), the phase adjuster 9 sets the Stage to 2 (S109c). Specifically, the phase adjuster 9 causes the angle retarding process to be executed at a time when the second phase control process is executed next time and the process of S105 onwards is executed. If the process of S109c is completed, the phase adjuster 9 executes a process of S109e.

On the other hand, if the variable ηa is not less than the variable ηb (S109b, No), the phase adjuster 9 sets the Stage to 0 (S109d). Specifically, the phase adjuster 9 causes the angle advancing process to be executed at a time when the second phase control process is executed next time and the process of S105 onwards is executed. If the process of S109d is completed, the phase adjuster 9 executes the process of S109e.

In the process of S109e, the phase adjuster 9 substitutes 0 for the variable α, substitutes the variable ηa for the variable ηb, and substitutes 0 for the variable ηa (S109e). If the above process is reviewed, it is confirmed in the process of S109a that the variable ηa is integrated by prescribed cycles, the large/small relation between the variable ηa and the variable ηb is confirmed in S109b, and the Stage is changed in the process of S109c or S109d. Thus, the purpose of S109e is to prepare for the next operation by resetting the respective variables. In step S109e, the phase adjuster 9 resets the variable α to 0, stores the value of the variable ηa in the variable ηb, and resets the variable ηa to 0. If the process of S109e is completed, the second phase control process is terminated (End).

By this operation of the phase adjuster 9, the phase of the current I can be adjusted in accordance with the points indicated in Table 1.

The driving device according to the first embodiment executes the first phase control process that adjusts the phase of the driving voltage V, based on the relationship between the phase of the current I and the rotational position information of the motor 4, and the second phase control process that adjusts the phase of the driving voltage V, based on the magnitude of the current I and the rotational speed of the motor 4. Since the control of the first phase control process is simple, the first phase control process can be executed more quickly than the second phase control process, and is more excellent in responsivity than the second phase control process. Since the second phase control process executes control, based on the index η, the second phase control process can drive even the interior permanent magnet-type motor with high efficiency. By combining these processes, the driving device according to the first embodiment quickly attains a phase near the optimal phase by the first phase control process, and then executes the second phase control process, thus being able to compatibly achieve both the responsivity of the phase control and the high-efficiency driving of the motor.

In addition, the driving device according to the first embodiment switches the first phase control process and the second phase control process in accordance with the number of times of inflection points, Ninfle. Specifically, in the state in which the number of times of inflection points, Ninfle, is less than the threshold, i.e., in the state in which the angle advancing process or angle retarding process for varying the shift amount toward the neighborhood of the optimal value is successively executed, the first phase control process having excellent responsivity of phase control is executed.

On the other hand, in the state in which the number of times of inflection points, Ninfle, is greater than the threshold, i.e., in the state in which the shift amount has reached the neighborhood of the optimal value, the second phase control process that can drive the motor with high efficiency is executed. In this manner, the driving device according to the first embodiment can compatibly achieve both the responsivity of the phase control and the high-efficiency driving of the motor.

Second Embodiment

A driving device according to a second embodiment differs from the driving device according to the first embodiment with respect to the content of the first phase control process. Hereinafter, the driving device according to the second embodiment is described with respect to different points from the first embodiment.

A description is given of a principle that is used for the first phase control process in the driving device according to the second embodiment. FIG. 11 is a waveform diagram illustrating an example of current detection by a shunt resistor. FIG. 11 illustrates examples of current waveforms detected in a case of using a shunt resistor for the current detector 6. FIG. 11 illustrates, from above in a vertically arranged order, three kinds of current waveforms that correspond, respectively, to a case where the phase of the driving voltage V advances, a case where a power factor is 1, and a case where the phase of the driving voltage V retards. As illustrated in FIG. 11, in a case of detecting the motor current by the shunt resistor, a waveform is obtained which is divided into six parts per cycle in regard to the output voltage phase of the power converter 1. At this time, if the phase of the driving voltage V and the phase of the current I coincide, a central portion of each divided part has a convex waveform shape, as illustrated in the middle part of FIG. 11. Note that if the phase of the driving voltage V and the phase of the current I coincide, an operation with a power factor of 1 is executed. If the phase of the driving voltage V advances, compared to the case of the power factor of 1, since the position of the convex portion of the waveform advances, a waveform inclining in a lower right direction, as illustrated in the upper part of FIG. 11, is obtained. If the phase of the driving voltage V retards, compared to the case of the power factor of 1, since the position of the convex portion of the waveform retards, a waveform inclining in an upper right direction, as illustrated in the lower part of FIG. 11, is obtained. In the second embodiment, the first phase control process is executed by utilizing this difference of the waveform shape.

A current value processor 10 included in the driving device according to the second embodiment differs from the current value processor 10 included in the driving device according to the first embodiment, in that the former further includes a function of transmitting a current value to the phase adjuster 9. Specifically, the current value processor 10 according to the second embodiment transmits the value of the current I, which is detected by the current detector 6, to the phase adjuster 9. The other structures of the driving device according to the second embodiment and the driving system including this driving device and the motor are similar to those in the first embodiment.

FIG. 12 is a flowchart illustrating the first phase control process of the driving device according to the second embodiment.

If the first phase control process is started (Start), the phase adjuster 9 initializes the variables $\beta$, Ia, Ib and Id to 0 (S121). The variable $\beta$ is a variable that is counted up in a case where the variable Id to be described later is positive, and is counted down in a case where the variable Id is not positive. The variable Ia is a variable in which the current value acquired from the current value processor 10 is stored. The variable Ib is a variable in which the previously acquired current value is stored. The variable Id is a variable in which a value obtained by subtracting the variable Ib from the variable Ia is stored.

Next, the phase adjuster 9 acquires the current value from the current value processor 10, and substitutes the current value for the variable Ia (S122). Specifically, the phase adjuster 9 acquires the present value of the current I from the current value processor 10, and substitutes the acquired value for the variable Ia.

Next, the phase adjuster 9 subtracts the variable Ib from the variable Ia, and substitutes the subtraction result for the variable Id (S123). The variable Ib is a variable in which the previously acquired current value is stored. Thus, by this process, a difference between the variable Ia, which is the current value acquired this time, and the variable Ib, which is the previously acquired current value, is substituted for the variable Id.

Next, the phase adjuster 9 determines whether the variable Id is positive (S124). If the variable Id is positive (S124, Yes), the phase adjuster 9 adds 1 to the variable $\beta$ (S125$a$). If the process of S125$a$ is completed, the phase adjuster 9 executes the process of S126. On the other hand, in S124, if the variable Id is not positive (S124, No), the phase adjuster 9 subtracts 1 from the variable $\beta$ (S125$b$). If the process of S125$b$ is completed, the phase adjuster 9 executes the process of S126.

In S126, the phase adjuster 9 substitutes the value of the variable Ia for the variable Ib (S126). By this process, the current value acquired this time is substituted for the variable Ib, and is used as a previously acquired current value in the next process.

Next, the phase adjuster 9 determines whether the cycle of the current I has changed to the next cycle (S127). If the cycle of the current I has not changed (S127, No), the process of S122 is executed. Specifically, until the cycle has changed, the process of S122 to S126 is repeatedly executed.

On the other hand, in step S127, if the cycle has changed (S127, Yes), the phase adjuster 9 determines whether the variable $\beta$ is positive (S128). By the process of S124, S125$a$ and S125$b$, the variable $\beta$ is counted up if the variable Id is positive and is counted down if the variable Id is negative. In addition, these processes are repeated by the process of S127 until the cycle of the current changes. As a result, the variable $\beta$ indicates, by a positive or negative number that is stored therein, whether the variable Id is positive in many cases or is not positive in many cases. Since the variable Id is the difference between the present current value and the previous current value, that the variable $\beta$ is positive means that the current I has a tendency of increase. That the variable $\beta$ is not positive means that the current I has a tendency of decrease. As described with reference to FIG. 11, if the phase of the driving voltage V retards, the waveform has a shape inclining in the upper right direction, and if the phase of the driving voltage V advances, the waveform has a shape inclining in the lower right direction. Thus, the phase adjuster 9 can estimate that the phase of the driving voltage V retards, since the variable $\beta$ is positive, and can estimate that the phase of the driving voltage V advances, since the variable $\beta$ is not positive.

In S128, if the variable $\beta$ is positive (S128, Yes), the phase adjuster 9 executes the angle advancing process (S129$a$).

This angle advancing process is the same as described with reference to FIG. 8. Since the variable β is positive, it is estimated that the phase of the driving voltage V retards. Thus, by executing the angle advancing process and advancing the phase of the driving voltage V, the phase of the driving voltage V can be made closer to the optimal phase. If the process of S129a is completed, the first phase control process is terminated (End).

In S128, if the variable β is not positive (S128, No), the phase adjuster 9 executes the angle retarding process (S129b). This angle retarding process is the same as described with reference to FIG. 9. Since the variable β is not positive, it is estimated that the phase of the driving voltage V advances. Thus, by executing the angle retarding process and retarding the phase of the driving voltage V, the phase of the driving voltage V can be made closer to the optimal phase. If the process of S129b is completed, the first phase control process is terminated (End).

In this manner, based on the waveform of the current I, too, the first phase control process can be implemented.

In addition, even in the case where the first phase control process is implemented in this manner, the driving device according to the second embodiment can compatibly achieve both the responsivity and the high-efficiency driving, like the first embodiment.

Modifications, Etc.

In the above-described embodiments, the example was described in which the rotor position detector 5 includes a rotary encoder or a Hall sensor, or the like, which is attached to the motor 4. The rotor position detector 5 may adopt a so-called sensor-less method, in which a sensor is not provided. In one example, the rotor position detector 5 directly detects the electromotive force E of the motor 4, and detects the position of the rotor, based on the phase or the like of the electromotive force E. In another example, the rotor position detector 5 acquires, from the current detector 6, information relating to the current I flowing through the motor 4. Then, the rotor position detector 5 estimates the position of the rotor, by using an operational state of the motor 4 such as the current I, and fixed constants or the like. Note that in a case where the rotor position detector 5 adopts the sensor-less method, the rotor position detector 5 may be implemented in the integrated circuit 12, together with the rotational speed arithmetic unit 7, voltage controller 8, phase adjuster 9 and current value processor 10.

In the above-described embodiments, the description was given of the example of the so-called 1-shunt method in which in the current detector 6 a shunt resistor is disposed at one location of the power supply line on the negative side (ground side) of the power converter 1. The current detector 6 may adopt a 3-shunt method in which shunt resistors are disposed at three locations, by disposing shunt resistors between the emitters of the three IGBTs 2 on the negative side (ground side) in the power converter 1 and the negative-side power supply line.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A driving device comprising:
a power converter configured to convert input power into an AC power, and to supply the AC power to a motor;
a voltage controller configured to control an operation of the power converter, thereby applying a driving voltage from the power converter to the motor; and
a phase adjuster configured to execute a first process of advancing a phase of the driving voltage and a second process of retarding the phase of the driving voltage, thereby adjusting the phase of the driving voltage, wherein
the phase adjuster is configured to execute:
a first phase control process of receiving first information relating to a relationship between a phase of a motor current flowing through the motor and a rotational position of the motor, and adjusting the phase of the driving voltage, based on the first information; and
a second phase control process of receiving second information relating to a magnitude of the motor current and third information relating to a rotational speed of the motor, and adjusting the phase of the driving voltage, based on the second information and the third information.

2. The driving device of claim 1, wherein the phase adjuster is configured to execute the first phase control process or the second phase control process, based on a first number of times by which the second phase control process is executed after the first phase control process, or by which the first phase control process is executed after the second phase control process.

3. The driving device of claim 2, wherein the phase adjuster is configured to execute the first phase control process if the first number of times is less than a first threshold, and configured to execute the second phase control process if the first number of times is equal to or greater than the first threshold.

4. The driving device of claim 2, wherein the phase adjuster is configured to reset the first number of times, if the first process is successively executed by a number of times greater than a second threshold, or if the second process is successively executed by a number of times greater than the second threshold.

5. The driving device of claim 1, wherein the phase adjuster is configured to control, in the first phase control process, the phase of the driving voltage in such a manner that the phase of the motor current coincides with a phase of an electromotive force detected from the rotational position of the motor.

6. The driving device of claim 1, wherein the second information includes information relating to a peak value in one cycle of an alternating current of the motor current, and the third information includes information relating to an inverse number of the rotational speed of the motor.

7. The driving device of claim 6, wherein the phase adjuster is configured to control, in the second phase control process, the phase of the driving voltage in such a manner that a product between the peak value and the inverse number of the rotational speed becomes smaller.

8. A control method of a motor, comprising:
converting input power into an AC power by a power converter, and supplying the converted AC power to the motor;

detecting a motor current flowing through the motor, a rotational position of the motor, and a rotational speed of the motor;

executing, based on the detected current and the detected rotational position, a first process of advancing a phase of a driving voltage that is applied from the power converter to the motor, and a second process of retarding the phase of the driving voltage, thereby adjusting the phase of the driving voltage; and executing, based on information relating to the detected current and the detected rotational speed, the first process and the second process if a first number of times by which the second process is executed after the first process, or by which the first process is executed after the second process, becomes equal to or greater than a first threshold, thereby adjusting the phase of the driving voltage.

9. The control method of the motor of claim 8, further comprising executing, based on information relating to the detected current and the detected rotational position, the first process and the second process if the first number of times is less than the first threshold, thereby adjusting the phase of the driving voltage.

10. The control method of the motor of claim 8, wherein the first number of times is reset if the first process is successively executed by a number of times greater than a second threshold, or if the second process is successively executed by a number of times greater than the second threshold.

11. The control method of the motor of claim 9, wherein control of the phase of the driving voltage is executed in such a manner that the phase of the motor current coincides with a phase of an electromotive force detected from the rotational position of the motor.

12. The control method of the motor of claim 8, wherein the information relating to the motor current and the rotational speed includes information relating to a peak value in one cycle of an alternating current of the motor current, and information relating to an inverse number of the rotational speed of the motor.

13. The control method of the motor of claim 12, wherein control of the phase of the driving voltage is executed in such a manner that a product between the peak value and the inverse number of the rotational speed becomes smaller.

* * * * *